United States Patent [19]
Hirose

[11] Patent Number: 5,560,560
[45] Date of Patent: Oct. 1, 1996

[54] FISHLINE TENSION MEASURING DEVICE FOR FISHING REEL

[75] Inventor: Haruomi Hirose, Tokyo, Japan

[73] Assignee: Daiwa Seiko, Inc., Tokyo, Japan

[21] Appl. No.: 318,999

[22] Filed: Oct. 6, 1994

[30] Foreign Application Priority Data

Oct. 7, 1993 [JP] Japan ..................... 5-251860

[51] Int. Cl.$^6$ ................................. A01K 89/00
[52] U.S. Cl. ........................... 242/223; 242/321
[58] Field of Search ..................... 242/223, 321; 73/862.56, 862.57, 862.626, 862.637, 862.642; 177/210 C, 238, 245; 254/268

[56] References Cited

U.S. PATENT DOCUMENTS

| | | | |
|---|---|---|---|
| 2,520,923 | 9/1950 | Franzel et al. | 73/862.57 X |
| 3,289,473 | 12/1966 | Louda | 73/862.56 X |
| 3,358,500 | 12/1967 | Flinth | 73/862.56 |
| 4,384,496 | 5/1983 | Gladwin | 177/210 CX |
| 4,840,327 | 6/1989 | Kaneko | 242/223 |
| 4,899,953 | 2/1990 | Toda | 242/223 X |
| 4,939,930 | 7/1990 | Ishizuki et al. | 73/862.626 X |
| 5,007,601 | 4/1991 | Emura et al. | 242/223 |
| 5,219,131 | 6/1993 | Furomoto | 242/223 |

FOREIGN PATENT DOCUMENTS

| | | | |
|---|---|---|---|
| 2719946 | 11/1978 | Germany | 73/862.637 |
| 64-5493 | 2/1989 | Japan | |

Primary Examiner—Daniel P. Stodola
Assistant Examiner—William A. Rivera
Attorney, Agent, or Firm—Longacre & White

[57] ABSTRACT

A fishline tension measuring device used in a fishing reel measures tensile forces applied to a fishline. The fishing reel fishline tension measuring device, when tension is applied to a fishline of a fishing reel, detects a load applied to a bearing which is transmitted from the fishline through a spool shaft, and detects the tension applied to the fishline according to a force transmission relationship between the fishline tension and the load. The device includes a bearing support member which journals the spool shaft and can be flexed according to the load, an electrostatic capacitance sensor which detects the flection of the bearing support member as a variation in the electrostatic capacitance from the displacement of at least one of electrodes disposed in the bearing support member, and tension detector which detects the fishline tension from the output of the electrostatic capacitance sensor according to the force transmission relationship.

15 Claims, 9 Drawing Sheets

FISHLINE TENSION MEASURING DEVICE FOR FISHING REEL

BACKGROUND OF THE INVENTION

The present invention relates to a fishline tension measuring device for a fishing reel, which measures tension applied to a fishline using an electrostatic capacitance sensor.

The present inventor, Mr. Hirose, has previously disclosed in Japanese Utility Model Kokai Publication No. Sho. 64-5493 a fishline tension measuring device for fishing reel, capable of measuring the tension caused on a fishline by use of a strain gage when fish is caught in the terminal tackles of a fishing reel.

FIGS. 12 to 14 respectively show the fishline tension measuring device that is disclosed in the above-mentioned publication. The fishline tension measuring device will be described below with reference to FIGS. 12 to 14.

In particular, FIG. 12 is a partially cutaway front view of the above disclosed fishline tension measuring device. In FIG. 12, reference character 12 designates a spool shaft journaled rotatably on side plates 4, 5 through bearings (one bearing 14 is only shown in FIG. 12). A spool 2 with a fishline 1 wound therearound is mounted rotatably on the spool shaft 12. A spool drive gear train is mounted within the side plate 5 and, by rotating a handle 23 the spool 2 can be rotationally driven through the spool drive gear train.

The bearing 14, which supports one end portion of the spool shaft 12 on the side plate 4, is fitted into a ring-shaped support ring 61 coaxially and integrally. The support ring 61 is fitted through a highly elastic spacer member 62 such as a Teflon sheet or the like into a bearing mounting portion 24 which is formed in the central portion of the inside of the side plate 4. When fish is caught in the terminal tackles and tension is applied to the fishline 1, the support ring 61 including the bearing 14 can be moved slightly in the diametrical direction (in the tension direction of the fishline 1) according to the loads that are given to the spool shaft 12.

Now, FIG. 13 is a section view of the bearing portion of the above disclosed device. The support ring 61 includes on the outer peripheral wall thereof a projection 63 which is disposed on the opposite position to the tension applying direction of the fishline 1 (a direction of an arrow F in FIG. 13) and, to the projection 63, there is screwed one end of a rectangular strain plate 64 having a thickness of 0.3 mm and formed of a SUS material or the like. Also, a block 65 is fixed to the other end of the strain plate 64 and a screw 66 for tension, which is so supported as to extend through the side plate 4 in the diametrical direction from outside, is threadedly engaged with the block 65. Thus, by screwing the screw 66 into the block 65, a given tensile force can be applied to the strain plate 64.

On the other hand, a pair of strain gages 67, 68 and a pair of strain gages 69, 70 are bonded to the front and back surfaces of the strain plate 64, respectively. These strain gages 67, 68, 69, 70 are used to detect tensile forces in the following manner. That is, when a load is given to the spool shaft 12 due to the tension of the fishline 1 and strain is generated in the strain plate 64 according to the load, the resistance values of the strain gages 67, 68, 69, 70 are varied according to the amounts of the strain, to thereby detect the tension applied to the fishline 1.

Now, FIG. 14 is a circuit diagram of a bridge circuit made by use of the above-mentioned strain gages. The bridge circuit is used to measure the above-mentioned variations in the resistance values of the strain gages. The strain gages 67, 69 are connected in series to each other, the strain gages 70, 68 are also connected in series to each other, and DC voltages are applied to two terminals $P_1$, $P_2$. A connecting point $P_3$ between the strain gages 67 and 69 and a connecting point $P_4$ between the strain gages 70 and 68 are respectively connected to the differential inputs of a voltage amplifier 71. The output of the voltage amplifier 71 is connected to a tension display part 72.

Since the above disclosed conventional fishline tension measuring device is structured in this manner, if fish is caught in the terminal tackles of a fishing reel and tension is applied to the fishline 1, in FIG. 13, the tension acts through the spool shaft 12 on the bearing 14 and, at the same time, the tension pulls the support ring 61 including the bearing 14 in a direction of an arrow F. Due to this, the support ring 61 compresses the spacer member 62 and moves slightly in the same direction according to the tension, thereby causing the strain plate 64 to extend elastically so as to produce strain in the strain plate 64.

Thus, if the strain is produced in the strain plate 64, then the resistance values of the strain gages 67, 68, 69, 70 respectively bonded to the strain plate 64 are varied to cause the bridge circuit shown in FIG. 14 to lose its balanced state, so that there is generated a potential difference between the connecting points $P_3$ and $P_4$. The potential difference is in proportion to the tension applied to the fishline 1.

After the potential difference is amplified by the voltage amplifier 71, it is output to the tension display part 72 where the tension is displayed.

Therefore, if an angler sees the display of the tension display part 72, then the angler can judge the magnitude of the currently applied tension easily.

In the above-mentioned tension measuring device disclosed in the Japanese Utility Model Kokai Publication No. Sho. 64-5493, to measure tension, it is necessary to add new parts such as the support ring 61, spacer member 62, strain plate 64, block 65 and the like. This results in the complicated structure, which is difficult to assemble and increases the manufacturing cost of the measuring device.

Further, since the strain plate 64 is thin and weak in strength, the measuring device it is difficult to provide the measuring device having sufficient strength satisfactory for a fishing reel which is used in the craggy place and thus an receive strong drop shocks and the like.

Since the strain gage receives various kinds of pressure and is caused to extend repeatedly, it has problems in durability and aged deterioration. In particular, due to the strain limit and aged deterioration of an adhesive agent used for bonding the strain gage, the zero balance and reproducibility of the strain gage are changed.

Further, since the four strain gages must be bake-adhered to the strain plate, there is required a high degree of technical skill and a complicated series of processes, such as application of the adhesive agent, bonding, pressurization, terminal processing, baking, moistureproof treatment, and the like.

Furthermore, the wires for the four strain gages must be connected together in a three-dimensional manner, and the respective connecting portions thereof must be treated with an anticorrosive, which requires the higher number of manufacturing steps and results in difficulty in assembling.

SUMMARY OF THE INVENTION

The present invention aims at eliminating the drawbacks found in the above-mentioned conventional measuring device. Accordingly, it is an object of the invention to provide a fishline tension measuring device for a fishing reel, which is simple in structure, is easy to assemble, and has sufficient strength.

In attaining the above-noted and other objects, the invention, in accordance with a first aspect thereof, provides a fishline tension measuring device which, when tension is applied to a fishline of a fishing reel, detects a load transmitted to a bearing through the fishline and a spool shaft, and then detects the fishline tension in accordance with a force transmission relationship between the fishline tension and the load detected. The fishing line tension measuring device includes: at least one bearing support member for journaling the spool shaft and flexible according to the load; an electrostatic capacitance sensor for detecting the flection of the bearing support member as a variation in the electrostatic capacitance thereof caused by a relative displacement of one of electrodes, disposed in the bearing support members, with respect to the other; and tension detect means for detecting the fishline tension from the output of the electrostatic capacitance sensor in accordance with the above-mentioned force transmission relationship.

Preferably, the bearing support member is made up of a base portion connected to a reel main body and a beam structure portion formed integrally with the base portion and flexible according to the load applied to the bearing through the spool shaft. The electrodes are disposed in the beam structure portion and base portion, respectively, so as to faces with each other.

According to a second aspect of the invention, there is provided a fishline tension measuring device which, when tension is applied to a fishline of a fishing reel, detects a load transmitted to a bearing through the fishline and a spool shaft, and then detects the fishline tension in accordance with a force transmission relationship between the fishline tension and the above load, the fishline tension measuring device including: position detect means for detecting the position of a level winder which reciprocates right and left in order to uniformly wind and arrange the fishline in order; a bearing support member for journaling the spool shaft and flexible according to the load; an electrostatic capacitance sensor for detecting the flection of the bearing support member as a variation in the electrostatic capacitance thereof caused by the displacement of at least one of electrodes disposed in the above-mentioned bearing support member; load detect means for detecting the load applied to the above-mentioned bearing in accordance with the output of the electrostatic capacitance sensor; and tension operation means for operating the position of the level winder detected by the position detect means and the load applied to the bearing detected by the load detect means in accordance with the above-mentioned force transmission relationship to thereby detect the fishline tension.

The invention according to the first aspect thereof is operated in the following manner. That is, if tension is applied to a fishline, then a load is transmitted to a bearing through the fishline and a spool shaft. A bearing support member is flexed according to the load. This flection causes electrodes respectively mounted to the bearing support members to be displaced slightly. This displacement in turn causes the electrostatic capacitance sensor to be displaced so that the distance between the electrostatic capacitance sensor and the electrode is caused to vary or the area of the electrode facing the electrostatic capacitance sensor is caused to vary, with the result that the electrostatic capacitance of the sensor is caused to vary. In accordance with a predetermined relationship, the tension measuring device detects the fishline tension corresponding to the variation in the electrode from the above-mentioned variation in the electrostatic capacitance.

If tension is applied to the fishline, then the beam structure portion of the bearing support member is flexed according to the load applied thereto from the bearing of the spool shaft. This flection of the beam structure portion causes an electrode mounted to the beam structure portion to be displaced slightly, which varies the distance between this electrode and another electrode mounted in the base portion the bearing support member. The variation in the distance between the two electrodes causes the distance between the electrodes of electrostatic capacitance sensor to vary or causes the areas of the mutually facing portions of the two electrodes to vary, so the electrostatic capacitance of the sensor is caused to vary. In accordance with the above-mentioned force transmission relationship that can be determined by the structure of the reel main body, the tension measuring device detects the fishline tension corresponding to the variation in the distance between the two electrodes from the variation in the electrostatic capacitance.

The invention according to the second aspect thereof is operated in the following manner. At first, the position of the fishline that is oscillated right and left by the level winder is detected by the level winder position detect means.

Next, one of the bearing support members is flexed according to the fishline tension applied thereto from the bearing of the spool shaft. The electrostatic capacitance sensor detects this flection as a variation in the electrostatic capacitance. The load detect means detects the load applied to the one of the bearing support members from the variation in the electrostatic capacitance.

When the other bearing support member is assumed as a fulcrum, the above-mentioned load and fishline tension vary in inverse proportion to a distance from the fulcrum. In accordance with this relationship, the tension operation means detects the fishline tension through operation according to the position of the fishline and the load.

BRIEF DESCRIPTION OF THE DRAWINGS

FIG. 3 is a perspective view of a bearing support member shown in FIG. 2.

FIG. 4 is a view to show a state in which an electrostatic capacitance sensor shown in FIG. 2 is mounted to the bearing support member.

DETAILED DESCRIPTION OF THE PREFERRED EMBODIMENTS

Now, description will be given below in detail of a fishline tension measuring device according to an embodiment of the invention with reference to the accompanying drawings.

Figure 1:
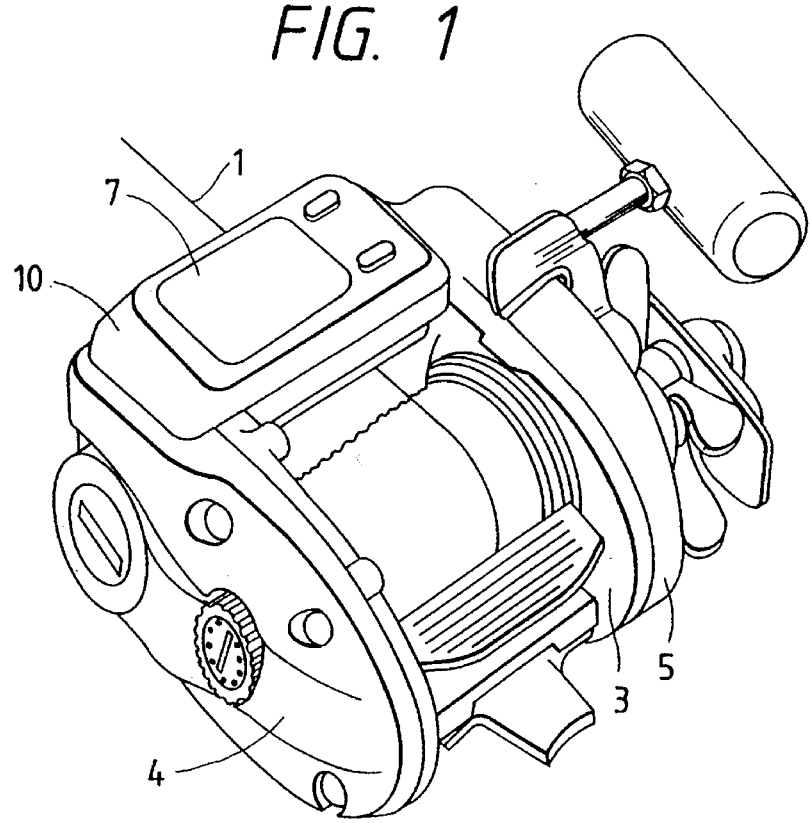
FIG. 1 is a perspective view of the entire construction of a fishline tension measuring device according to an embodiment of the invention.

FIG. 1 is a perspective view of the entire construction of a fishing reel including the fishline tension measuring device. In FIG. 1, reference character 3 designates a frame, 4, 5 respectively stand for side plates respectively fixed to the right and left of the frame 3, 10 represents an IC module including a tension measuring circuit, and 7 expresses a display part.

Figure 2:
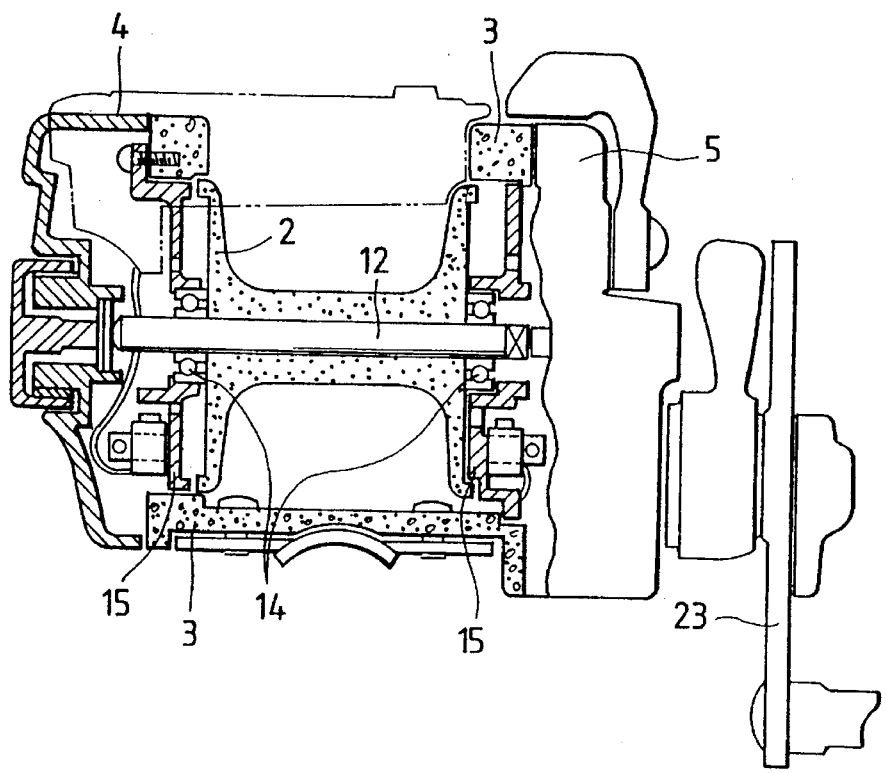
FIG. 2 is a partially cutaway front view of the device shown in FIG. 1.
Figure 13:
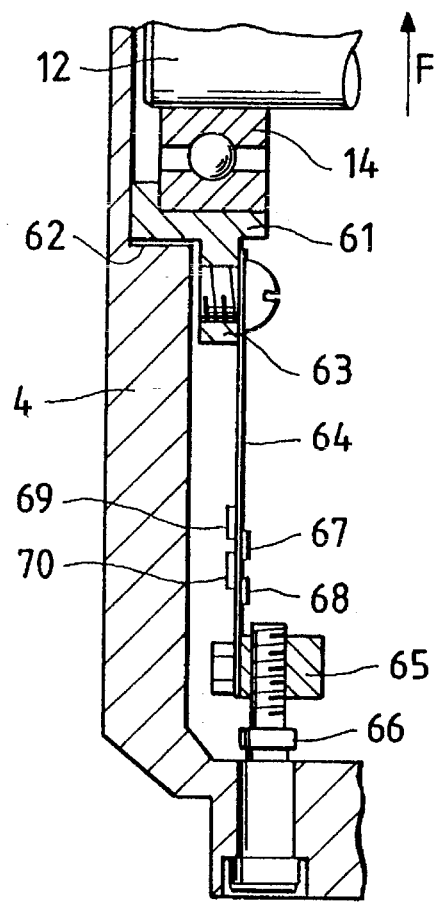
FIG. 13 is a section view of a bearing portion in the conventional device.
Figure 14:
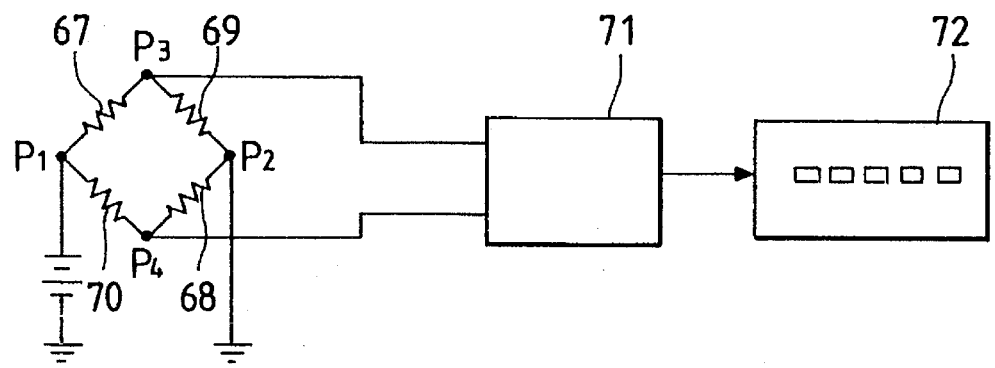
FIG. 14 is a circuit diagram of a bridge circuit using a strain gage in the conventional device.

FIG. 2 is a partially cutaway front view of the above-mentioned fishing reel. In FIG. 2, inside of the side plates 4, 5, two bearing support members 15 are respectively screwed to the frame 3 in such a manner that they face each other, bearings 14 such as ball bearings or the like are respectively mounted to the central portions of the two bearing support members, and a spool shaft 12 is rotatably journaled through the bearings 14. A spool 2 is mounted on the spool shaft 12 and the spool 2 is rotated to thereby wind a fishline therearound.

Although not shown, a spool drive gear train is included in the side plate 5 and, by rotationally operating a handle 23 mounted to the side plate 5, the spool 2 can be rotationally driven through the spool drive gear train.

FIG. 3 is a perspective view of one of the above-mentioned bearing support members 15. The bearing support member 15 is integrally formed with a base portion 9 to be screwed to the frame 3, a bearing mounting portion 24 for mounting the bearing 14 to the bearing support member 15, and a beam structure portion 25 the fulcrum of which is fixed to the base portion 9 and also which can be flexed with the bearing mounting portion 24 as the loading point thereof. In FIG. 3, the base portion 9 is screwed in such a manner that a fishline tension Fx to be applied to the bearing mounting portion 24 is directed perpendicularly with respect to the beam structure portion 25.

A grounded negative electrode 26 is so disposed as to be perpendicular to the flexing direction of the beam structure portion 25 and is then fixed to the beam structure portion 25. An electrostatic-capacitance sensor (including a positive electrode) 17 is so disposed as to face the negative electrode 26 and is then fixed to the base portion 9 by use of a sensor set screw 19.

Now, FIG. 4 is a view of the electrostatic capacitance sensor 17, showing a state in which the sensor 17 is mounted to the bearing support member 15. If the fishline tension Fx is applied onto the spool shaft 12, then a load is applied to the bearing mounting portion 24 through the spool shaft 12 and bearing 14, and the beam structure portion 25 is flexed in proportion to the fishline tension Fx, thereby causing the negative electrode 26 to be displaced. On the other hand, the sensor 17 is not displaced because it is fixed to the base portion 9 screwed to the frame 3. For this reason, the gap between the negative electrode 26 and the positive electrode included in the electrostatic capacitance sensor 17 varies only by the amount that corresponds to the flection of the beam structure portion 25.

Figure 5:
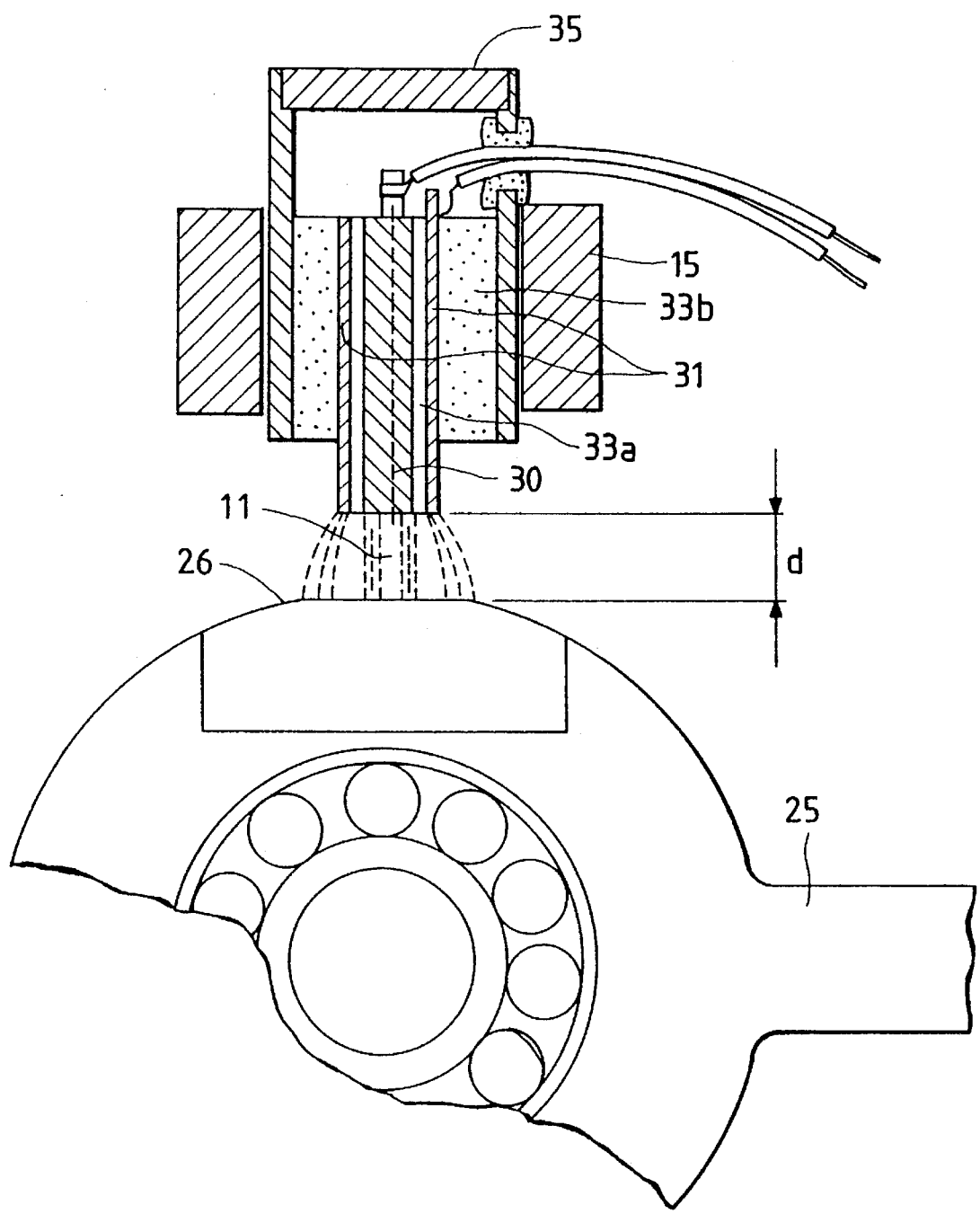
FIG. 5 is a sectional view of the electrostatic capacitance sensor shown in FIG. 4.

FIG. 5 shows a sectional view of the electrostatic capacitance sensor 17. The positive electrode 30 is enclosed and fixed by a guard ring 31 coaxially therewith through an insulation layer 33a, and the guard ring 31 is fixed to a shield case 35 through another insulation layer 33b. If a code is connected to the positive electrode 30 and a voltage is applied thereto, then there is formed a power line 11 between the positive electrode 30 and the grounded negative electrode 26. In the present embodiment, although provision of the guard ring 31 may be dispensed with in the present invention, if the guard ring 31 is kept at the same potential as the negative electrode 30 by means of a low impedance and is so disposed as to enclose the positive electrode 30, then the guard ring 31 prevents floating capacitance from being generated from the periphery of the positive electrode 30 and also prevents the power line 11 from spreading to thereby allow the power line 11 to reach the negative electrode 26 from the positive electrode 30 uniformly.

The section area S of the power line 11 provides an electrode area substantially. For this reason, electrostatic capacitance $C_1$ formed between the positive electrode 30 and the negative electrode 26 can be given according to the following equation:

$$C_1 = \epsilon \cdot S/d \quad (1)$$

where, S expresses the above-mentioned electrode area, d expresses a gap length between the positive and negative electrodes, and $\epsilon$ expresses the dielectric constant of air. That is, if the beam structure portion 25 is flexed due to the fishline tension to displace the negative electrode 26 and thus to vary the gap length d, then the electrostatic capacitance $C_1$ varies according to the above-mentioned equation (1).

Figure 6:
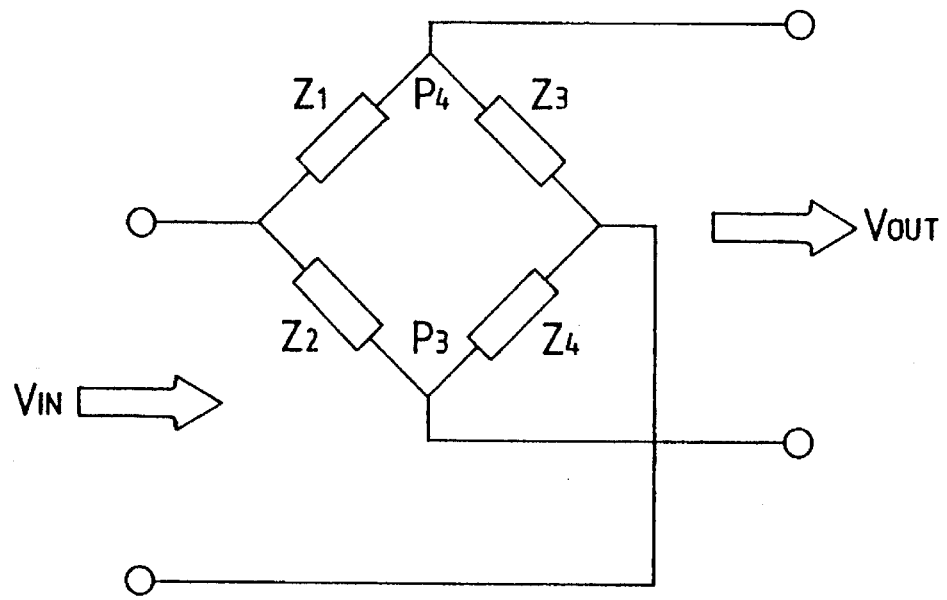
FIG. 6 is a circuit diagram showing an example of a bridge circuit in the present invention.

In the present embodiment, a bridge circuit is used to detect the above-mentioned electrostatic capacitance. In FIG. 6, there is shown an example of the bridge circuit. $Z_1$ to $Z_4$ designate impedances, respectively. The impedances $Z_1$ and $Z_3$ are connected in series to each other and an input voltage $V_{in}$ is applied to the two terminals of the series connected impedances. Similarly, the impedances $Z_2$ and $Z_4$ are connected in series to each other and an input voltage $V_{in}$ is applied to the two terminals of the series connected impedances. A potential difference between a connecting point $P_3$, where the impedances $Z_2$ and $Z_4$ are connected, and a connecting point $P_4$, where the impedances $Z_1$ and $Z_3$ are connected, is amplified to provide an output voltage $V_{out}$. If the circuit is made in such a manner that an equilibrium condition represented by an equation $$Z_1 \cdot Z_4 = Z_2 \cdot Z_3 \quad (2)$$

can hold in this bridge, then the output voltage $V_{out}$ provides a zero (0) volt. This bridge circuit is characterized in that, if the above equilibrium condition is lost, the variation in the output voltage can be detected with very high accuracy.

Figure 7:
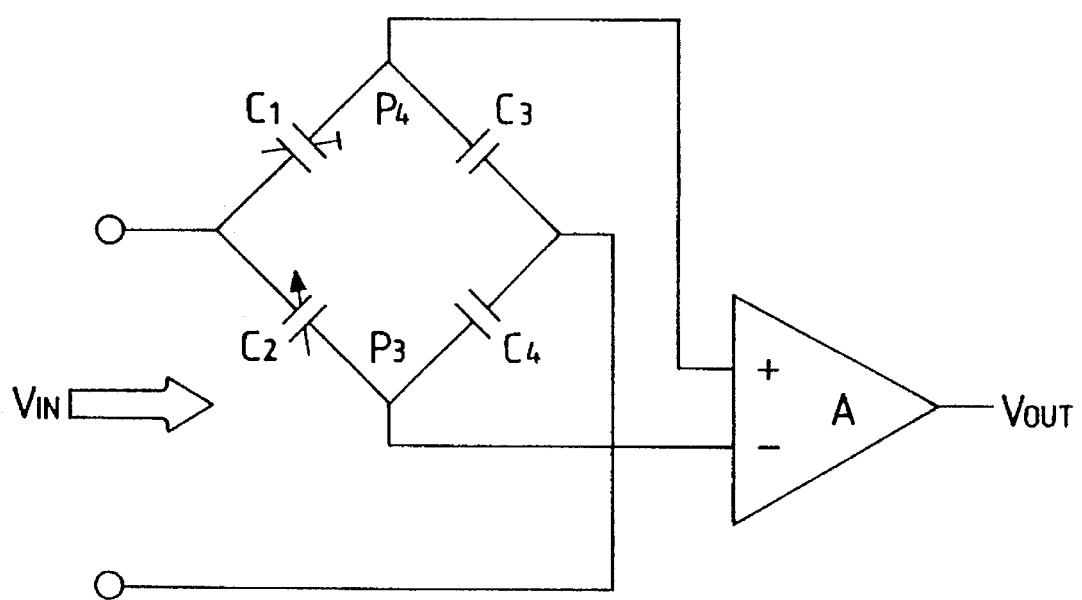
FIG. 7 is a circuit diagram showing another example of a bridge circuit in the present invention.

In FIG. 7, there is shown another example of the bridge circuit. That is, the impedances $Z_1$ to $Z_2$ are made up of electrostatic capacitances $C_1$ to $C_4$, respectively. The electrostatic capacitance formed between the electrodes 26 and 30 in FIG. 5 is positioned, for example, in $C_1$. A voltage difference between a connecting point $P_4$, where the capacitances $C_1$ and $C_3$ are connected, and a connecting point $P_3$, where the capacitances $C_2$ and $C_3$ are connected, is amplified A times to thereby provide an output voltage $V_{out}$. In this case, if the electrostatic capacitances $C_3$ and $C_4$ are set to be equal to each other and the electrostatic capacitance $C_2$ is set so that the equilibrium condition represented by the above equation (2) can hold, then the output voltage $V_{out}$ provides a zero (0) volt. If the fishline tension is applied and the beam structure portion 25 is flexed by an amount $\Delta d$, then the gap d between the two electrodes 26 and 30 varies to $d+\Delta d$. Thus, the output voltage $V_{out}$ can be expressed by the following equation (3):

[Expression 1]

$$V_{out}=A*(-K/(1+K))*(\Delta d/((1+K)d+K*\Delta d))*V_{in} \quad (3)$$

where, $K=C_3/C_2$, and A expresses the gain of an amplifier.

Assuming that $\Delta d \ll d$, if the above equation (3) is approximated, then the following equation can be obtained:

$$V_{out}=A*(-K/(1+K(+K)^2)*(\Delta d/d)*V_{in} \quad (4)$$

Therefore, the output voltage $V_{out}$ varies in proportion to the amount of flection $\Delta d$. Here, since the amount of flection of the beam structure portion 25 varies in proportion to the fishline tension within the elastic limit thereof, the output voltage $V_{out}$ provides a value which is in proportion to the fishline tension and thus the fishline tension can be detected from the output voltage $V_{out}$.

Figure 8:
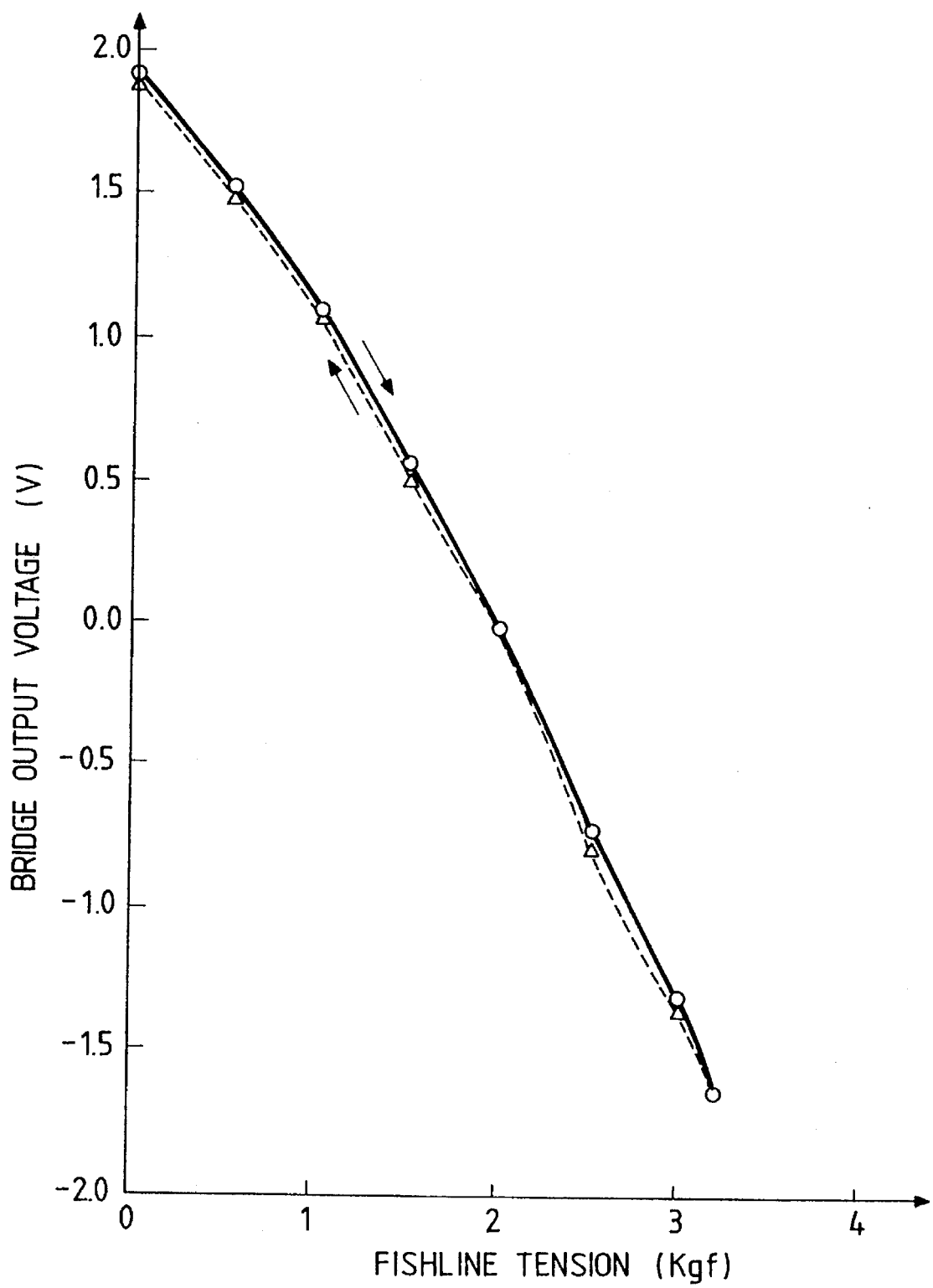
FIG. 8 is a graphical representation of a relationship (actually measured) between the fishline tension and the bridge output voltage.

FIG. 8 is a graphical representation of an actually measured example of a relationship between the fishline tension and bridge output voltage. Fishline tension was applied to a fishline of a fishing reel and the output voltage (after amplified) of the above-mentioned bridge circuit was actually measured. The abscissa of FIG. 8 expresses the fishline tension (Kgf), while the ordinate thereof expresses the output voltage (V) of the bridge circuit. In this measurement, the bridge circuit was set in such a manner that the equilibrium condition of the bridge can be satisfied when the fishline tension is 2 Kgf. This characteristic shows that the fishline tension and the output voltage of the bridge circuit offer a good proportional characteristic between them. A solid line in FIG. 8 points out a characteristic which is obtained when the load is increased, while a dotted line indicates a characteristic obtained when the load is decreased. A difference between the two characteristics expresses the hysteresis of the beam structure portion but, however, this difference is so small that it can be neglected from the viewpoint of the object of the present fishline tension measuring device. Therefore, regardless of the history of the tension loading, the fishline tension can be found from the output voltage of the above-mentioned bridge circuit.

Figure 9:
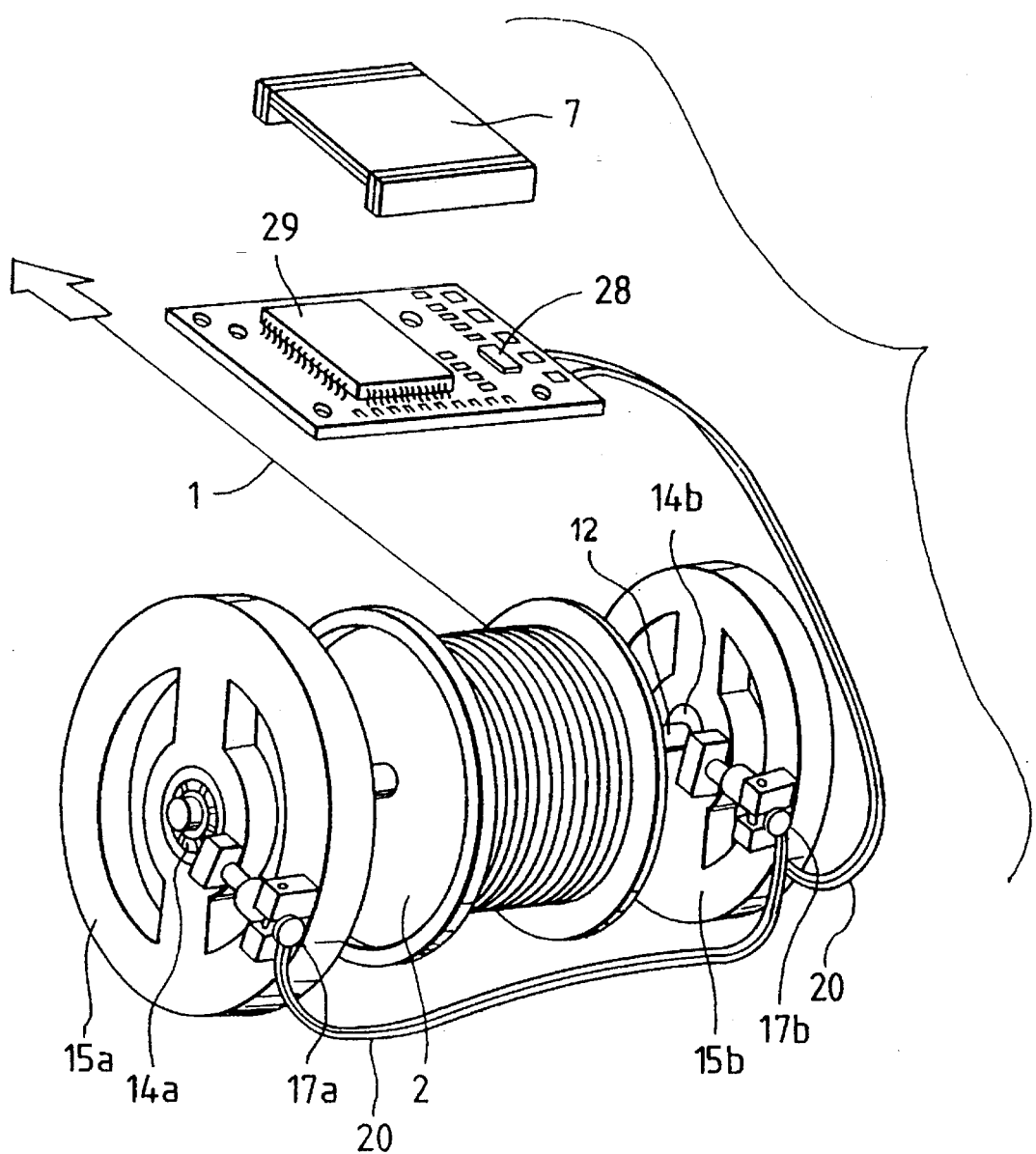
FIG. 9 is an exploded perspective view of the device shown in FIG. 1, with a frame removed from a reel main body.

In FIG. 9, there is shown an exploded perspective view of the whole of the fishline tension measuring device shown in FIG. 1, with the frame removed from the reel main body. In this figure, reference character 1 designates a fishline, 2 a spool with the fishline wound therearound, 12 a spool shaft which is a rotary shaft of the spool, $14_a$, $14_b$ bearings respectively engaged with the two sides of the spool shaft 12, $15_a$, $15_b$ bearing support members respectively for supporting or journaling the spool shaft 12 through the two bearings 14, $17_a$, $17_b$ electrostatic capacitance sensors respectively mounted to the two bearing support members, 20 a sensor cord which connects the two electrostatic capacitance sensors in series to each other, 28 a fishline tension detect circuit connected to the sensor cord 20, 29 a microcomputer which inputs the signal of the fishline tension detect circuit 28, and 7 a liquid crystal display part which is to be driven by the microcomputer 29.

Description will be given below of the operation of the above fishline tension measuring device. Tension applied to the fishline 1 is transmitted from the spool through the spool shaft 12 to the two-end-side bearings 14. Therefore, the fishline tension is equal to the sum of tensile forces respectively measured by the two electrostatic capacitance sensors $17_a$, $17_b$. Thus, the electrostatic capacitances of the two sensors are connected in series to each other and there is obtained a composite electrostatic capacitance which corresponds to the sum of the tensile forces. The composite electrostatic capacitance is connected through the sensor cord 20 to the fishline tension detect circuit 28. The fishline tension detect circuit 28 may be composed of the above-mentioned bridge circuit of FIG. 7 and a differential amplifier circuit. The bridge circuit outputs an output voltage varying in proportion to the fishline tension, and (if necessary, A/D converts) inputs it into the microcomputer 29. The microcomputer 29 drives the liquid crystal display part 7 to display a fishline tension corresponding to the input.

In the embodiment, there are two electrostatic capacitance sensors but, however, this is not limitative. When a transmission relationship between the fishline tension and the load to be applied onto one of the bearings can be determined by the structure of the reel main body, of course, a single electrostatic capacitance sensor may be mounted on only one of the bearing support members. For example, in a state where the level winder is oscillating the fishline, if the fishline tension is loaded in such a manner that it reciprocates from end to end on the spool shaft, then the load to be applied to one of the bearing support members varies periodically. When the maximum value, minimum value and average value of the variations of the load of the one bearing support member is measured by the tension measuring means, then the measured values respectively correspond to the values that are obtained when the fishline tension is loaded at the nearest point, farthest point, and central point on the spool shaft from the bearing support member to be measured. When the other bearing support member is considered as a fulcrum, then the fishline tension and the above load values vary in inverse proportion to the respective distances to the fulcrum and, therefore, the fishline tension can be detected from the above load values.

Also, in the embodiment, the electrostatic capacitance sensors are mounted in a direction to be able to detect the flection variations from the variations in the distance between the electrodes. However, this is not limitative but, of course, the electrostatic capacitance sensors may be disposed in a direction where the electrode area facing the beam structure portion is caused to vary due to the flection of the beam structure portion. In this case, if the two electrostatic capacitance sensors of the beam structure portion are connected in parallel to each other and are then connected to the above-mentioned bridge circuit, then the output of the bridge circuit varies in proportion to the fishline tension and, therefore, the structure of the tension measuring means may be similar to that of the above-mentioned embodiment.

Although the bridge circuit is used to detect the electrostatic capacitance in the embodiment, the invention is not limited to this but, for example, the above-mentioned electrostatic capacitances may be connected to a tank circuit of an LC oscillation circuit and the electrostatic capacitances may be detected from the oscillation frequency. Also, alternatively, it is also possible that the above-mentioned electrostatic capacitances may be connected to an RC time constant circuit and the electrostatic capacitances may be detected from the measured values of the phase, gain, or step response delay.

Also, although the DC voltage is input to the bridge circuit in the embodiment, this is not limitative but, alternatively, it is also possible that an AC voltage may be input to the bridge circuit to obtain the effective value of the output voltage thereof or a DC voltage value after the output voltage is rectified. Also, in the case of the AC voltage input, the bridge circuit is not limited to the structure using the electrostatic capacitances $C_1$ to $C_4$ but any other structure may be employed, provided that it uses an impedance element which satisfies the above equilibrium condition equation (2).

Further, although there are used the two-fulcrum beam structure portion in the embodiment, the invention is not limited to this but a one-fulcrum cantilever structure or a continuous beam structure having three or more fulcrums may also be employed, provided that it can cause a bending operation due to the fishline tension.

Moreover, in the embodiment, description has been given of the case in which there is a proportional relationship between the fishline tension and the tension detect circuit output. However, the invention is not limited to this. Even when the above-mentioned proportional relationship does not exist due to the material or shape of the beam structure portion, the characteristics of the electrostatic capacitance sensors, the characteristics of the bridge circuit, and the like, if there exist a correspondence relationship and reproducibility between the fishline tension and the tension detect circuit output judging from the actually measured results, then it is of course possible to find the fishline tension by processing a numerical formula based on the correspondence relationship or by operating a table representing the correspondence relationship.

Next, description will be given below in detail of a fishline tension measuring device according to another embodiment of the invention with reference to the accompanying drawings.

It is an object of the present embodiment to detect a fishline tension by means of detection of a tensile force to be applied to one of bearing support members and detection of the position of a fishline.

Figure 10:
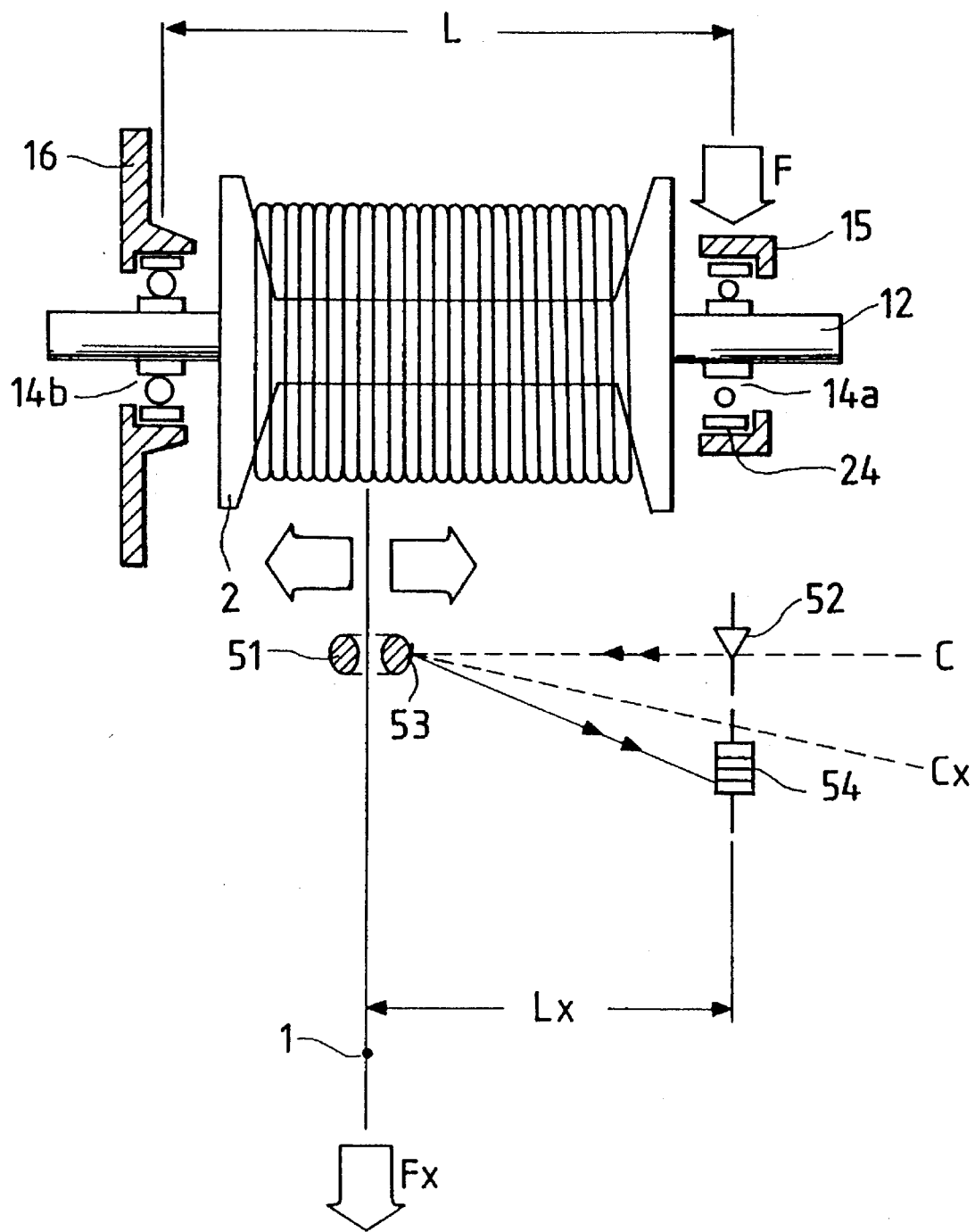
FIG. 10 is an explanatory view of a fishline tension measuring device according to another embodiment of the invention.

In FIG. 10, there is shown an explanatory view of the embodiment according to the invention. In this figure, reference character 1 designates a fishline, 2 a spool around which the fishline 1 is to be wound, 12 a rotary shaft of the spool 2, $14_a$ and $14_b$ bearings respectively engaged with the two sides of the spool shaft 12, 16 a un-flexible bearing support member for journaling the spool shaft through the bearing $14_b$, 15 a flexible bearing support member for journaling the spool shaft through the bearing $14_a$, 51 a level winder for oscillating the fishline 1 right and left in order to wind the fishline 1 in line when winding the fishline 1 around the spool 2, 52 a light emitting diode, 53 a reflection plate mounted to the level winder, and 54 a semiconductor position detector (PSD).

The operation of the present embodiment is as follows: That is, if a fishline tension Fx is applied to the spool shaft 12, then a load F is applied to the bearing support member 15, with the un-flexible bearing support member 16 as a fulcrum. Here, when a distance between the two bearing support members 15, 16 are expressed as L, and a distance from the position of the fishline 1 on the spool to the bearing support member 15 is expressed as Lx, then a relationship between the fishline tension Fx and the load F can be expressed in the following equation:

$$F \cdot L = Fx \cdot (L - Lx) \qquad (5)$$

Therefore, the fishline tension Fx can be expressed in the following equation:

$$Fx = F \cdot L / (L - Lx) \qquad (6)$$

That is, even when the loads applied to the two bearings are not detected, if the load F applied to one bearing and the distance Lx are detected, then the fishline tension Fx can be detected by use of the above equation (6).

The load F can be detected by means of detection of a flection variation by an electrostatic capacitance mounted to the bearing support member 15. The details of the detection are the same as in the previously described embodiment, except that only one electrostatic capacitance sensor is used and it is connected to a measuring bridge circuit.

The distance Lx can be detected by detecting the position of the level winder 51 which oscillates the fishline right and left. For example, the position of the level winder 51 can be detected by use of a reflection type optical sensor. This is a well known technique and thus the detailed description thereof is omitted here. However, in brief, the light that is emitted from the light emitting diode mounted in the bearing support member 15 or the like is reflected and returned back by the reflection plate 53 of the level winder 51. As shown in FIG. 10, if the optical axis of the reflection plate 53 is inclined from a perpendicular line C between the light emitting diode 52 and semiconductor position detector 54 (PSD) and is set as an optical axis $C_x$, then the spot of the reflected light varies according to the distance Lx. In the case shown in FIG. 10, the position of the reflected light spot and distance Lx are in proportion to each other. This proportional relationship can be detected by the one-dimensional semiconductor position detector 54 (PSD). The semiconductor position detector 54 is also referred to as a position sensor head which can produce an output corresponding to the incident position of the light by use of an optical detect element produced as an applied element of a silicone photodiode.

Figure 11:
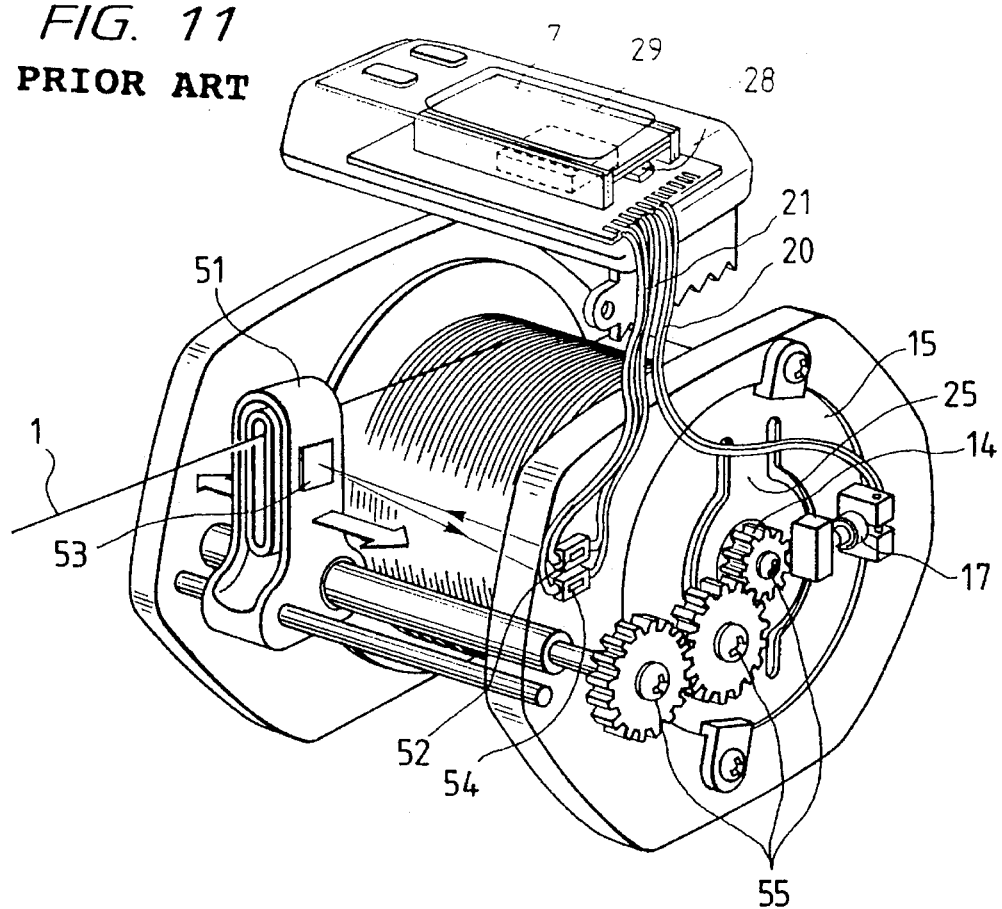
FIG. 11 is a perspective view of the entire construction of the device shown in FIG. 10.
Figure 12:
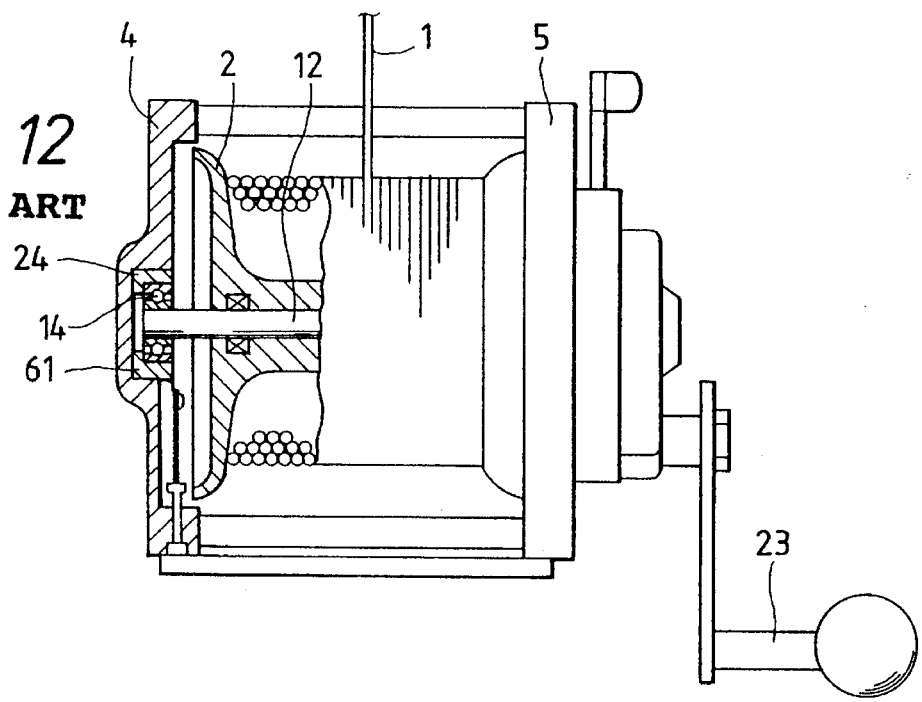
FIG. 12 is a partially cutaway front view of a conventional fishline tension measuring device.
Figure 13:
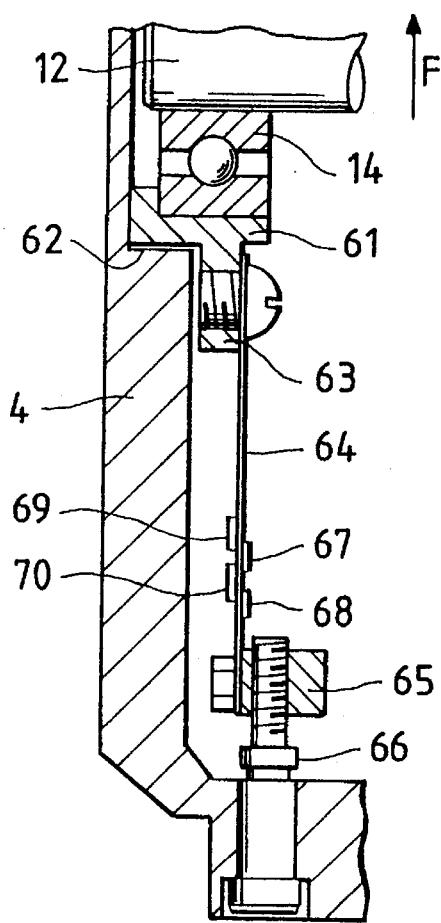
Figure 14:
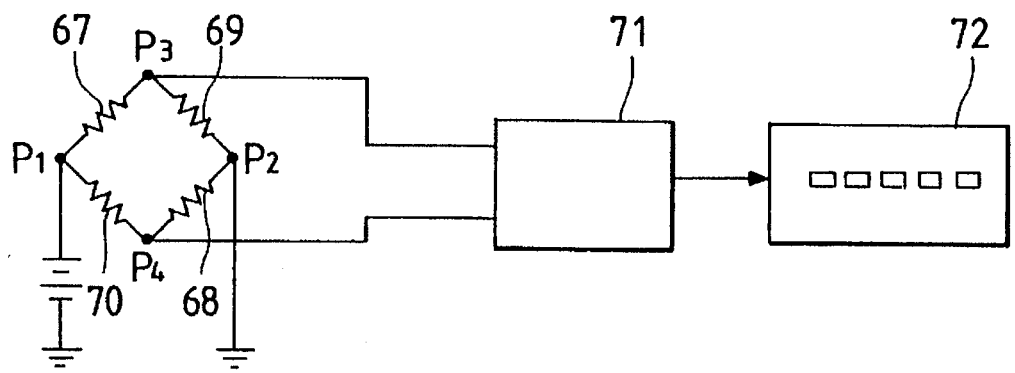

In FIG. 11, there is shown a perspective view of the whole of the embodiment according to the invention. In this figure, reference character 1 designates a fishline, 15 a bearing support member, 25 a beam structure portion, 17 an electrostatic capacitance sensor, 51 a level winder, 55 a level winder drive gear, 52 a light emitting diode, 53 a reflection plate, 54 a semiconductor position detector (PSD), 20, 21 respectively sensor cords, 28 a fishline tension detect circuit, 29 a microcomputer, and 7 a display part.

In operation, if the fishline tension Fx is applied, then loads are applied to the two bearings 14. As a result of this, the beam structure portion 25, which is loaded through one of the bearings 14, is caused to flex. The flection of the beam structure portion 25 in turn causes the distance between the electrodes of the electrostatic capacitance sensor 17 to vary. The electrostatic capacitance sensor 17 is connected to the fishline tension detect circuit 28 by means of the sensor cord 20 to thereby complete a bridge circuit. The output of the bridge circuit varies in proportion to the load F of the beam structure portion 25. The output of the bridge circuit, after amplified, (if necessary, it is A/D converted) outputs a signal indicating the load F to be applied to the bearing support member 15.

On the other hand, the light that is emitted from the light emitting diode 52 is reflected by the reflection plate 53 of the level winder 51, and the distance Lx is detected by the semiconductor position detector (PSD) 54, as a reflection spot position. This detect signal (if necessary, it is A/D converted) is output to the microcomputer 29 by means of the sensor cord 21. On receiving the detect signal, the microcomputer 29 computes the equation (6) to find the fishline tension Fx, and displays it on the display part 7. According to the above-mentioned structure, it is possible to measure the fishline tension always, whether the level winder 51 is in operation or at rest.

Although there is used the semiconductor position detector (PSD) in the embodiment, this is not limitative but, of course, a CCD element, an optical linear encoder or the like can also be used.

Also, in the embodiment, the light is used as the means for detecting the distance Lx. However, the invention is not limited to this but, alternatively, a potentiometer may be mounted to the level winder shaft to detect the distance Lx from the variations in the resistance value. Also, of course, a differential transformer may be mounted to the level winder 51 to detect the distance Lx from the variations in the induced electromotive force.

Further, in the embodiment, the distance to the level winder is detected as the detect means of the distance Lx. However, this is not limitative but it is also possible to find the distance Lx from the number of revolutions of the level winder drive gear 55. In this case, there are available a method which detects the number of revolutions of the gear 55 by means of a rotary encoder, a rotation type potentiometer or the like.

Although in the embodiment the distance Lx is detected and the fishline tension is computed by the microcomputer according to the detected distance Lx, the invention is not limited to this. There may be mounted, for example, a contact switch which is used to detect the fact that the level winder comes to a predetermined position (for example, the central position $Lx = L/2$) and the moment the level winder 51 comes to the predetermined position the force F applied to the bearing support member 15 may be detected, whereby the fishline tension may be detected from the detected value of the force F (for example, when $Lx = L/2$, then $Fx = 2 \cdot F$).

Further, in the embodiment, the output of the fishline tension measuring device is displayed on the display part 7. However, the invention is not limited to this but there can be also employed the following methods, alternatively:

(1) When angling at night, a single angler may use several rods. If fish is caught, then the fishline tension varies and a sound is produced as the output of the fishline tension measuring device according to the variation in the fishline tension. In this case, the threshold value of the fishline tension may be set and the sound may be produced if the fishline tension is equal to or greater than the threshold value, or, the magnitude, frequency, time length and intervals of the sound may be changed according to the values of the fishline tension.

Also, light may be turned on as means for notifying the angler of the fishline tension. Both the sound and light may be used, or may be used selectively.

(2) When a tensile force equal to or greater than the yield strength of the fishline is applied to the fishline, the drag will slip to play out the fishline to thereby prevent the fishline from being cut. The angler adjusts the drag while pulling the fishline. In this operation, in the present embodiment, in order to inform the angler of the state of the fishline tension, the tension is output by means of display of the numerical value, representation of a graph, display by illustration, change in color, and the like.

(3) From the time when fish bites at the bait to the time when the fish is landed, the angler must play tactfully to the movements of the fish. Conventionally, an expert angler plays out the fishline when the fish moves around strongly, and takes up the fishline quickly when the movement of the fish is weak. During this fighting with the fish, in the present embodiment, not only the fishline tension can be displayed to notify the angler of the conditions of the movements of the fish, but also, by means of the microcomputer employed in the present embodiment, a fishline play-out signal when the fishline tension is equal to or greater than the set value or a fishline take-up signal when the fishline tension is smaller than the set value can be output to the control part of an electrically powered reel. Of course, the microcomputer of the present embodiment can be used in combination with the control microcomputer of the electric-powered reel.

(4) There is a demand from an angler that data on the angling fight with fish are output and studied. In view of this, the variations with time in the fishline tension may be stored in the memory of the microcomputer and be output afterwards. In this case, the variations may be displayed on the display part of the present embodiment, may pe printed out, may be recorded into a recording medium such as a magnetic disk or the like, or may be output to a personal computer or word processor through communication.

As has been described heretofore, according to the invention, when compared with the conventional fishline tension measuring device, there is provided a structure which measures the flection of the bearing support member forming a component of a fishing reel to thereby eliminate the provision of structure components such as a strain plate, a spacer member and the like, so that there can be provided a fishline tension measuring device which is simplified in structure and also which can reduce the size and weight of the fishing reel itself.

Also, since the fishline tension measuring device according to the invention has a structure which does not include a component weak in strength such as a strain plate and also which uses the flection of the bearing support member within the elastic limit thereof, sufficient strength and durability can be secured with respect to drop shocks or the like.

Further, since the electrostatic capacitance sensor is a sensor of a non-contact type, it is free from such loading pressures as in the strain gage and is thus advantageous in the durability and change with the elapse of time.

The electrostatic capacitance sensor eliminates a highly advanced and complicated process in the portion to be measured such as the bonding and firing process and the like which have been necessary in the conventional strain gage and, therefore, use of such sensor is advantageous in the manufacturing cost and man-hour.

And, because the connecting portion of the electrostatic capacitance sensor is sealed into the sensor itself and the connecting cord thereof is extended externally thereof, unlike the conventional strain plate, there is eliminated the need for a corrosion preventive treatment in the terminal connecting portion. For this reason, when the sensor is used in the present fishline tension measuring device which is exposed to seawater or the like, it is advantageous in reliability and man-hour.

Also, in a feature of the present invention, due to the fact that, by forming the bearing support members integrally with the base portion and beam structure portion, without disposing the electrode of the electrostatic capacitance on another part, both electrodes can be disposed in the bearing support members, the electrodes can be mounted and adjusted easily on the bearing support members before the fishing reel is assembled. Also, since the two electrodes are disposed in the same member, the variations in the positions of the electrode are small, which allows an accurate tension measurement for a long period of time. Further, even if the bearing support members are mounted loosely, since the relative distance between the base portion and beam structure portion is free from the loose mounting, a remarkably highly accurate tension measurement is possible.

In a feature of the invention, both of two electrostatic capacitance sensors are not required but a tension measurement is possible by use of one electrostatic capacitance sensor and by detection of the position of the level winder (for arrangement of the fishline) and, therefore, the spool drive gear train, drag, clutch and the like are previously assembled, especially, there is no need to assemble the present fishline tension measuring device into the right side of the reel which is limited in space. Due to this, the present fishline tension measuring device provides an excellent effect in that the whole reel can be reduced in size and can be assembled with more ease.

What is claimed is:

1. A fishline tension measuring device in combination with a fishing reel, for measuring a tension caused on a fishline on the basis of a load applied to a spool shaft, said fishline tension measuring device comprising:

at least one bearing support member for supporting said spool shaft, said bearing support member being flexible and flexing in response to said load being applied to said spool shaft;

an electrode disposed on said bearing support member;

an electrostatic capacitance sensor, disposed on said bearing support member, for detecting a variation in electrostatic capacitance caused by a relative displacement of said electrode with respect to said electrostatic capacitance sensor, and providing an output indicative of the flection of said bearing support member; and tension detect means for receiving said output of said electrostatic capacitance sensor and determining said fishline tension in accordance with a predetermined relationship between said output indicative of the flection of said bearing support member and said tension.

2. A fishline tension measuring device as set forth in claim 1, wherein said bearing support member includes a base portion connected to a reel main body and a beam structure portion formed integrally with said base portion for receiving said load, said beam structure portion being flexible and flexing according to said load with respect to said base portion.

3. A fishline tension measuring device as set forth in claim 2, wherein said electrostatic capacitance sensor is disposed on said base portion and said electrode is disposed on said beam structure portion.

4. A fishline tension measuring device as set forth in claim 2, wherein said beam structure portion extends in a first direction, and said electrode and said sensor are juxtaposed in a second direction transverse to said first direction.

5. A fishline tension measuring device as set forth in claim 3, wherein said beam structure portion extends in a first direction, and said electrode and said sensor are juxtaposed in a second direction transverse to said first direction.

6. A fishline tension measuring device as set forth in claim 4, wherein said second direction is substantially coincident with a direction of said load.

7. A fishline tension measuring device as set forth in claim 5, wherein said second direction is substantially coincident with a direction of said load.

8. a fishline tension measuring device as set forth in claim 1, further comprising:

position detect means for detecting a position of a level winder through which said fishline extends towards said spool shaft and which reciprocates to uniformly wind said fishline around said spool shaft, and providing an output for said tension detect means indicative of said position;

wherein said predetermined relationship between said output indicative of the flection of said bearing support member and said tension depends on the position of said level winder.

9. A fishline tension measuring device as set forth in claim 8, wherein, the position detection means comprises a reflective optical sensor.

10. A fishline tension measuring device as set forth in claim 9, wherein, said reflective optical sensor further comprises;

a light emitting diode mounted on said bearing support member for emitting light;

a reflector mounted on said level winder for reflecting the light emitted from said diode; and a semiconductor position detector mounted to said bearing support member, adjacent to said light emitting diode, which produces an output corresponding to the incident position of the light for detecting the relative position of said level winder with respect to said bearing support member.

11. A fishline tension measuring device as set forth in claim 8, further comprising;

a display member mounted on said fishing reel to alert a fisherman that threshold tension exists in said fishline.

12. A fishline tension measuring device as set forth in claim 8, further comprising;

a play-out on said fishing reel to reduce a drag on said fishline when said tension in said fishline reaches a threshold level.

13. A fishline tension measuring device as set forth in claim 1, further comprising;

a display member mounted on said fishing reel to alert a fisherman that threshold tension exists in said fishline.

14. A fishline tension measuring device as set forth in claim 1, further comprising;

a play-out means on said fishing reel to reduce a drag on said fishline when said tension in said fishline reaches a threshold level.

15. A fishline tension measuring device in combination with a fishing reel, for measuring a tension caused on a fishline on the basis of a load applied to a spool shaft, said fishline tension measuring device comprising:

at least one bearing support member for supporting said spool shaft, said bearing support member being flexible and having a portion which flexes according to said load, and a portion which does not flex according to said load;

an electrode disposed on said portion of said bearing support member which flexes according to said load;

an electrostatic capacitance sensor, separate from said electrode, disposed on said portion of said bearing support member which does not flex according to said load, for detecting a variation in electrostatic capacitance caused by a relative displacement of said electrode with respect to said electrostatic capacitance sensor, and providing an output indicative of the flection of said bearing support member; and tension detect means for receiving said output of said electrostatic capacitance sensor and determining said fishline tension in accordance with a predetermined relationship between said output indicative of the flection of said bearing support member and said tension.

* * * * *